United States Patent [19]
Viaud

[11] Patent Number: 5,181,461
[45] Date of Patent: Jan. 26, 1993

[54] ROUND BALER STARTER ROLL HAVING EASILY CHANGEABLE SURFACE ELEMENTS FOR MODIFYING THE AGGRESSIVENESS OF THE ROLL

[75] Inventor: Jean Viaud, Sarreguemines, France

[73] Assignee: Deere & Company, Moline, Ill.

[21] Appl. No.: 702,563

[22] Filed: May 20, 1991

[30] Foreign Application Priority Data

Jun. 18, 1990 [DE] Fed. Rep. of Germany ....... 4019335

[51] Int. Cl.⁵ .................. B30B 5/06; A01D 39/00
[52] U.S. Cl. .................. 100/88; 56/341; 492/44
[58] Field of Search .......... 100/5, 87, 88, 89; 56/341; 29/127

[56] References Cited

U.S. PATENT DOCUMENTS

| | | | |
|---|---|---|---|
| 710,102 | 9/1902 | Jones | 29/127 |
| 1,568,401 | 1/1926 | Griffith | 29/127 |
| 1,660,538 | 2/1928 | Whitney | 29/127 |
| 2,121,925 | 6/1938 | Oczko | 29/127 |
| 2,921,426 | 1/1960 | Heth | 56/341 |
| 3,132,459 | 5/1964 | Grillot | 56/341 |
| 4,172,354 | 10/1979 | Vermeer | 100/88 |
| 4,422,373 | 12/1983 | Gaeddert | 100/88 |
| 4,426,926 | 1/1984 | Soteropulos | 100/88 |
| 4,510,741 | 4/1985 | Campbell | 100/88 |
| 4,581,879 | 4/1986 | Anstey | 100/88 |
| 4,759,788 | 7/1988 | Ward | 29/127 |
| 4,782,652 | 11/1988 | White | 100/89 |
| 4,910,949 | 3/1990 | Meyer | 100/88 |

Primary Examiner—Philip R. Coe
Assistant Examiner—Randall Edward Chin

[57] ABSTRACT

The starter roll of a baler for rolling crop products into a large cylindrical bale has, in accordance with a first embodiment, a pair of ribs coated with or made of rubber or another friction enhancing material that are releasably attached to the roll for increasing its aggressiveness. In another embodiment, the roll has a pair of cylindrical shells releasably secured thereabout, the shells being coated with rubber or another friction enhancing material for increasing its aggressiveness.

3 Claims, 2 Drawing Sheets

ROUND BALER STARTER ROLL HAVING EASILY CHANGEABLE SURFACE ELEMENTS FOR MODIFYING THE AGGRESSIVENESS OF THE ROLL

BACKGROUND OF THE INVENTION

The present invention relates to balers for forming cylindrical bales from a crop and more specifically relates to the starter roll located at the bale forming chamber inlet of such a baler.

Balers for the formation of so-called round bales are used for baling various types of crops under varied harvesting conditions. Depending on the strength, the moisture content and the size of the stalks of the particular crop, there are variations in their behavior during the conveying and baling process. Nevertheless, it is desirable to be able to bale all crops under the most varied conditions with a single baler.

Starter rolls of some known balers, like that disclosed in U.S. Pat. No. 4,428,282 for example, have a smooth, metallic crop-engaging surface which performs satisfactorily under most crop conditions to set the crop into rotation for forming a cylindrical core upon which additional crop is wrapped during the baling process.

In order to get more aggressiveness for aiding in more difficult crop conditions, in particular when baling crop for silage feed, it is known to provide the crop-engaging surface of the starter roll with helical impellers.

Beyond that it has become known that the roller should be provided with moldings or ribs oriented parallel to the axis of rotation for performing a moderately aggressive conveying effect upon the crop. It is further known that these ribbed rollers may be rubber-coated to increase their aggressiveness against the crop, such ribbed and coated rollers being disclosed in U.S. Pat. No. 4,426,926 granted on Jan. 24, 1984.

All of the previously described balers operate satisfactorily with the majority of crops and under most harvesting conditions; however, under unfavorable conditions very dry crop is not carried along by the roller and may slide past it and lead to clogging.

The problem underlying the invention is seen as that of proposing a baler for baling cylindrical bales from a crop, with a bale forming chamber having an inlet at its underside, the inlet having a starter roll positioned therein for aiding in the rolling up of crop products entering the inlet and the starter roll being adaptable to a multitude of crops and baling conditions including dry crop conditions.

SUMMARY OF THE INVENTION

According to the present invention, there is provided an improved starter roll design which is adaptable for working efficiently in various baling and crop conditions.

A broad object of the invention is to provide a starter roll having appropriate exterior features and composition for effectively carrying and orienting crop being rolled into a cylindrical bale.

A more specific object of the invention is to provide a starter roll designed for having its exterior altered by the addition or elimination of exterior features and composition to in order for being more suited to aiding in the baling process of a given crop under a given condition.

The above objects are accomplished by providing starter rolls which are adapted for having impellers or ribs releasably attached to the exterior thereof at diametrically spaced locations, the ribs extending lengthwise of the roll; or by providing starter rolls which are adapted for having semi-cylindrical shells attached thereabout. In both cases, the added structures are constructed of or coated with aggressive, wear resistant material such as rubber or the like.

These and other objects will become apparent from a reading of the following description together with the appended drawings.

DESCRIPTION OF THE PREFERRED EMBODIMENT

Figure 1:
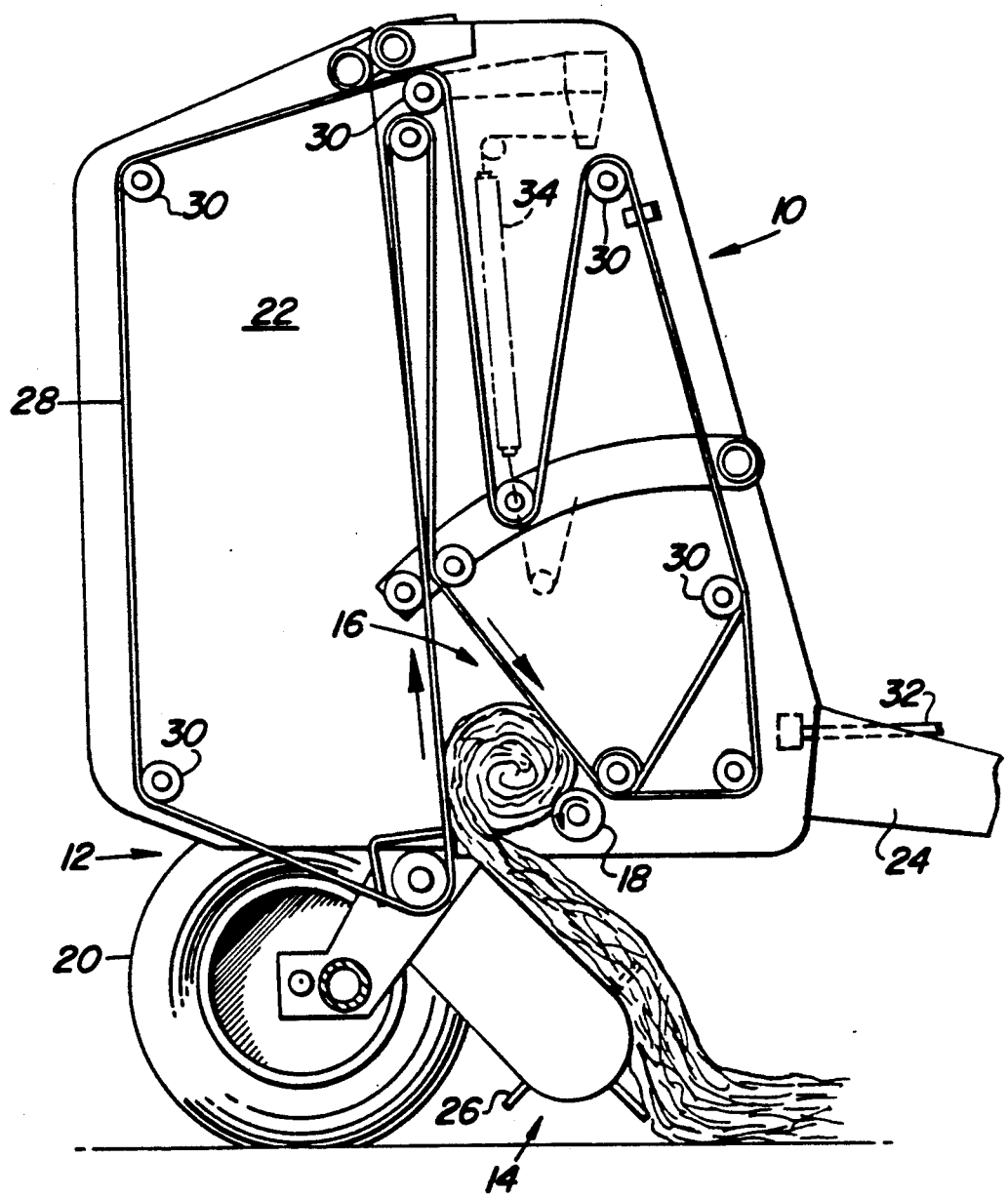
FIG. 1 is a right side elevational view of a baler embodying a starter roll which is particularly suited for benefiting from the present invention.

Referring now to FIG. 1, there is shown a baler 10 for making large cylindrical bales of straw, hay, grass or similar crops that are deposited in windrows on a field or are cut there. The baler 10 is composed generally of a frame 12 having a pickup arrangement 14 attached thereto beneath a bale forming chamber 16 having an inlet at its bottom in which is positioned a bale starter roll 18. The frame 12 is supported on a pair of ground wheels 20 and includes opposite side walls 22 and a draft tongue 24 for connection to the drawbar of an agricultural tractor. The pickup 14 includes circulating teeth 26 that take up the crop deposited on the ground in windrows and transports it to the bale forming chamber 16.

In FIG. 1, and hence in its initial condition, the bale forming chamber takes the form of a wedge that is delimited on front and rear sides by separate runs of a set of belts 28. The set of belts 28 are arranged side-by-side and run over a plurality of rolls 30. One or more of the rolls 30 are brought into rotation through a drive arrangement 32 from the agricultural tractor, and move the belts 28 in a particular direction. The belts 28 are put under tension by a tensioning device 34 that yieldably resists the expansion of the bale chamber 16 as the bale grows therewithin. As can be seen in FIG. 1, crop is delivered to the bale forming chamber 16 and is brought into rotation by the separate runs of the belts which travel in opposite directions in order to form the core of a bale. During operation across the field, more and more crop is transported to the bale forming chamber 16 so that the core of the bale enlarges and causes the chamber to expand against the resisting force of the tensioning device 34. The segments of the belts 28 forming the chamber 16 can lengthen under increased tension at the tensioning device 34 until the bale forming chamber 16 has taken up nearly all the space between the side walls 22 at which time the baler is stopped so that no further crop enters the chamber before the bale is wrapped and ejected, in a well known manner.

The roller 18 is located in the lower region of the bale forming chamber 16, extends lengthwise between the two side walls 22, is oriented parallel to the axis of the rolls 30, does not change its position during the baling process, always moves near the surface of the belts 28 and is also driven by the drive arrangement 32. Due to its location, the roll 18 assists in the initial phase of the baling process by assisting bringing the crop into rotation in the initially empty baling chamber 16 in order to form the core of the bale. For this purpose, it moves in a direction opposite that of the adjacent run of the belts 28.

Figure 2:
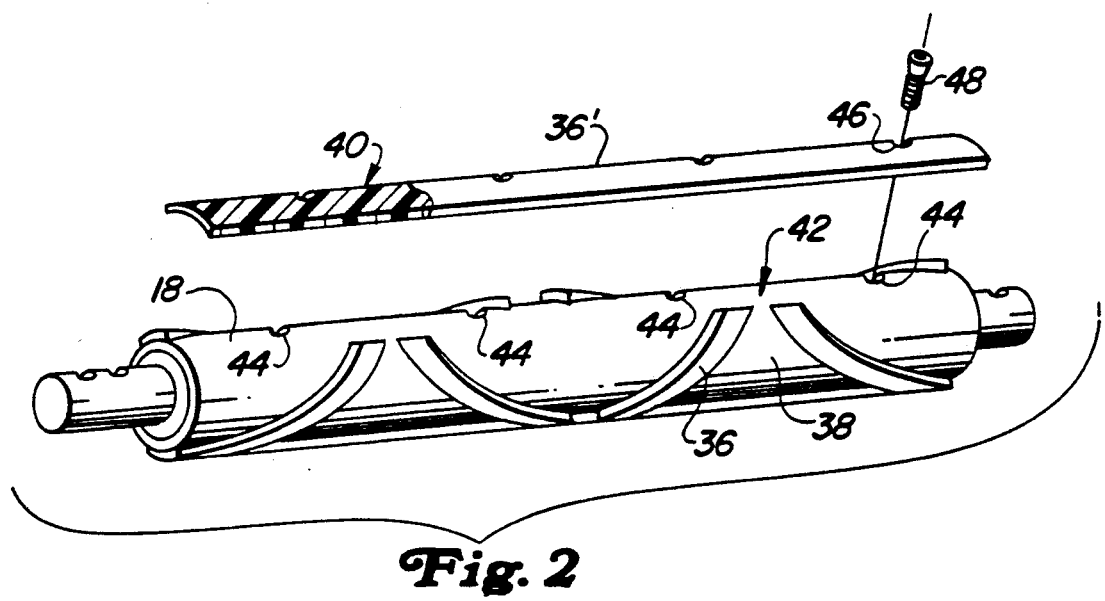
FIG. 2 is a front view of a first embodiment of an exterior feature that may be releasably attached to a starter roll for modifying the aggressiveness thereof.
Figure 3:
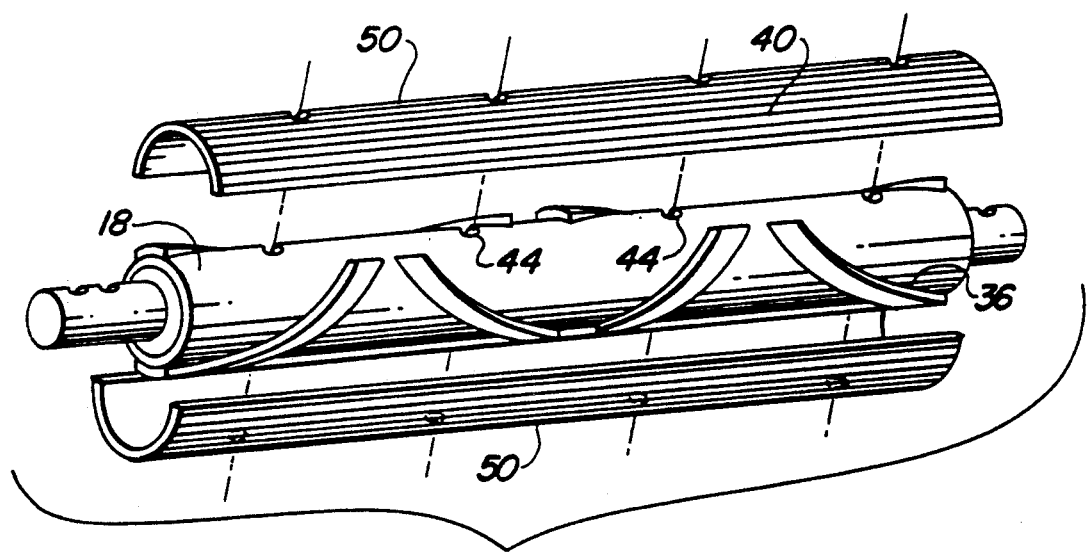
FIG. 3 is a front view of a second embodiment of an exterior feature that may be releasably attached to a starter roll for modifying the aggressiveness thereof.

The embodiments of the rolls 18 according to FIGS. 2 and 3 have the common feature that metal impellers or ribs 36 are fixed, as by welding, to the surface of the cylindrical core of the roll in a similar arrangement. Specifically, the impellers 36 are arranged in double rows that converge to arrow points, and are spaced axially so as to leave spaces 38. The impellers 36 do not extend over the entire circumference of the roll 18, but are interrupted at two diametrically opposite places and leave between them a slot 42 directed parallel to the axis of rotation of the roller 18, in which region several threaded holes 44 are located.

According to FIG. 2, each slot 42 between the helically arranged impellers 36 is filled by a straight impeller 36', configured as a rib or molding and oriented parallel to the axis of rotation of the roller 18, and attached by screws 48 received in the holes 46. This impeller 36' is provided with a coating 40 on those of its surfaces that are not in contact with the roll 18. The impeller 36' could alternatively be made entirely of a material having requisite wear resistance and frictional characteristics.

In the embodiment according to FIG. 3, each impeller 36' is eliminated and replaced by a shell 50 that is also attached by screws 48 in the same threaded holes 44. Both shells 50 are semi-cylindrical so that they encompass a 180° arc and cover the entire circumference of the roller 18 including the impellers 36 which remain in place. The outer surfaces of the shells 50 are covered with the aforementioned coating of rubber or other substance having the requisite wear resistance and frictional properties.

The advantage of the detachable impellers 36' or the shells 50 lies in the fact that those parts made of, or covered with a coat of, a substance that is wear resistant and which increases the aggressiveness of the roll can be attached or detached selectively as required in order to match the aggressiveness of the roll to the crop and/or harvest conditions.

While the rolls 18 are here shown having the impellers 36 arranged in a particular way, it should be understood that impellers having a variety of arrangements for producing desired aggressiveness may be used with the only requirement being that the impeller arrangements be such as to leave space for the detachable impellers to be fixed to the cylindrical core of the roll.

I claim:

1. In a baler for forming cylindrical bales from a crop having a bale forming chamber having an inlet wherein there is disposed a bale starter roll including an elongate cylindrical core having a central longitudinal axis and having a plurality of helically arranged ribs permanently fixed thereto at axially spaced locations therealong, the improvement comprising: said ribs being arranged so as to define rib free diametrically opposed areas extending the entire length of, and in parallel relationship to said axis of, the core; and an impeller being releasably secured to said core in covering relationship to substantially all of each of said diametrically opposed areas of said core and having crop engaging surfaces made of a material having wear resistant and friction increasing characteristics whereby the aggressiveness of the roll is enhanced when the impellers are added thereto.

2. The baler defined in claim 1 wherein said impellers are in the form of a pair of semi-cylindrical shells which are releasably attached to the core in encompassing relationship to the core and the ribs.

3. The baler defined in claim 1 wherein each impeller is in the form of an elongate bar located entirely within a respective one of said diametrically opposed areas.

* * * * *